(12) United States Patent　　(10) Patent No.: US 10,239,612 B1
Whitten et al.　　(45) Date of Patent: Mar. 26, 2019

(54) AUTOMATED COMMISSIONING AND FLOORPLAN CONFIGURATION

(71) Applicant: Cooper Technologies Company, Houston, TX (US)

(72) Inventors: Jonathan Andrew Whitten, Senoia, GA (US); Michael Alan Lunn, Peachtree City, GA (US)

(73) Assignee: Cooper Technologies Company, Houston, TX (US)

( * ) Notice: Subject to any disclaimer, the term of this patent is extended or adjusted under 35 U.S.C. 154(b) by 0 days.

(21) Appl. No.: 15/653,907

(22) Filed: Jul. 19, 2017

Related U.S. Application Data

(60) Provisional application No. 62/364,025, filed on Jul. 19, 2016.

(51) Int. Cl.
　*B64C 39/02*　　(2006.01)
　*G06Q 10/08*　　(2012.01)
　*G06Q 10/10*　　(2012.01)
　*H04L 29/08*　　(2006.01)

(52) U.S. Cl.
　CPC .......... *B64C 39/024* (2013.01); *G06Q 10/08* (2013.01); *G06Q 10/10* (2013.01); *H04L 67/125* (2013.01)

(58) Field of Classification Search
　CPC ........ G08C 17/02; G08C 23/04; G08C 17/00; G08C 2201/30; G08C 2201/50; G08C 2201/92; G08C 2201/91; G08C 2201/20
　USPC ....................................... 340/13.24
　See application file for complete search history.

(56) References Cited

U.S. PATENT DOCUMENTS

| | | | | |
|---|---|---|---|---|
| 8,867,819 B2* | 10/2014 | Calio | .................... | G06Q 10/087 382/153 |
| 9,025,861 B2* | 5/2015 | Furukawa | ............... | G06T 17/00 382/154 |
| 9,342,928 B2* | 5/2016 | Rasane | .................. | G06T 19/006 |
| 9,967,709 B2* | 5/2018 | Patel | ........................ | G01S 11/06 |
| 2014/0236642 A1* | 8/2014 | Eskridge | ................ | G06Q 10/02 705/5 |
| 2017/0146349 A1* | 5/2017 | Yang | ..................... | G01C 21/005 |

* cited by examiner

*Primary Examiner* — Mark S Blouin
(74) *Attorney, Agent, or Firm* — King & Spalding LLP

(57) ABSTRACT

An automated commissioning and floorplan configuration (CAFC) device can include a CAFC system having a transceiver and a CAFC engine, where the transceiver communicates with at least one device disposed in a volume of space, where the CAFC engine, based on communication between the transceiver and the at least one device, commissions the at least one device.

20 Claims, 4 Drawing Sheets

AUTOMATED COMMISSIONING AND FLOORPLAN CONFIGURATION

CROSS-REFERENCE TO RELATED APPLICATIONS

This application claims priority under 35 U.S.C. § 119 to U.S. Provisional Patent App. Ser. No. 62/364,025, titled "Automated Commissioning and Floorplan Configuration" and filed on Jul. 19, 2016, the entire contents of which are hereby incorporated herein by reference.

TECHNICAL FIELD

The present disclosure relates generally to devices in a room or other volume of space, and more particularly to systems, methods, and devices for automatically commissioning such devices and configuring a floorplan in such room or other volume of space.

BACKGROUND

Commissioning of equipment within a volume of space (e.g., a room, an office complex) is a time-consuming but necessary process that must be completed before the equipment is put into service. Part of the commissioning process involves the precise location of the equipment within the volume of space.

SUMMARY

In general, in one aspect, the disclosure relates to an automated commissioning and floorplan configuration (CAFC) device. The automated CAFC device can include a CAFC system that includes a transceiver and a CAFC engine, where the transceiver communicates with at least one device disposed in a volume of space, where the CAFC engine, based on communication between the transceiver and the at least one device, commissions the at least one device.

In another aspect, the disclosure can generally relate to a non-transitory computer-readable medium including instructions that when executed by a hardware processor perform a method for auto-commissioning a system of equipment. The method can include traveling along a path in a volume of space. The method can also include communicating, along a first section of the path, with a first piece of equipment in the volume of space, where communicating with the first piece of equipment comprises receiving first identification information of the first piece of equipment and sending commissioning instructions to the first piece of equipment. The method can further include communicating, along a second section of the path, with a second piece of equipment in the volume of space, where communicating with the second piece of equipment includes receiving second identification information of the second piece of equipment and sending commissioning instructions to the second piece of equipment. The method can also include communicating, after traveling the first section and the second section of the path, to a network manager that the first piece of equipment and the second piece of equipment are commissioned.

These and other aspects, objects, features, and embodiments will be apparent from the following description and the appended claims.

BRIEF DESCRIPTION OF THE DRAWINGS

The drawings illustrate only example embodiments and are therefore not to be considered limiting in scope, as the example embodiments may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements.

DETAILED DESCRIPTION

Figure 1:
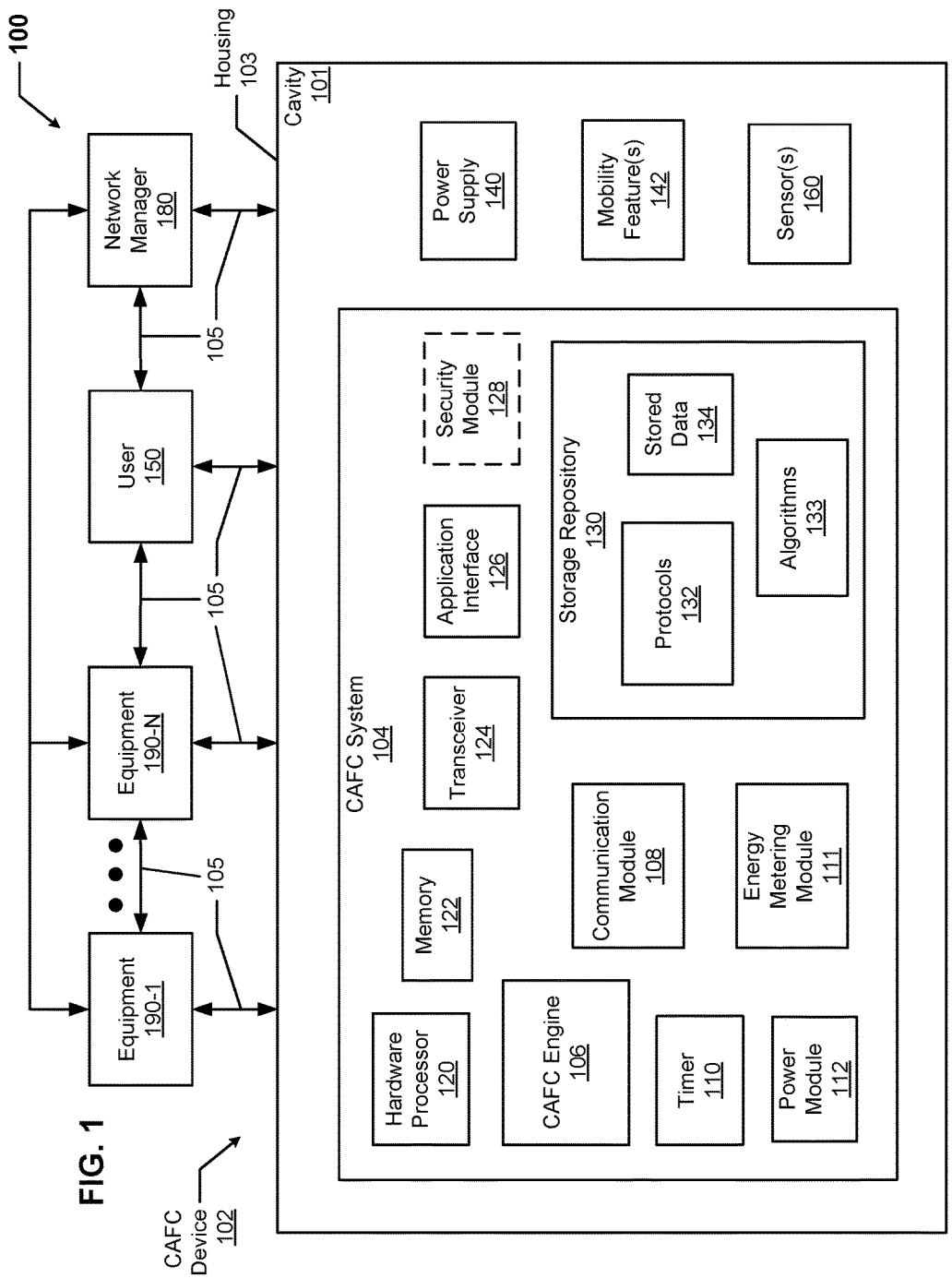
FIG. 1 shows a system diagram of a lighting system that includes a CAFC device in accordance with certain example embodiments.

The example embodiments discussed herein are directed to systems, methods, and devices for auto-commissioning of equipment in a system using an automated commissioning and floorplan configuration (referred to herein as CAFC) device. In some cases, a system can be a lighting system. In such a case, example embodiments may be directed to one or more of a number of electrical devices of a lighting system that are not light fixtures. For example, example embodiments can be used for auto-commissioning thermostats, control devices for adjusting window coverings, remote sensor devices used to control one or more light fixtures, and control devices for tinting windows. Further, example embodiments can be used for auto-commissioning electrical devices that are not part of a lighting system. Examples of such other electrical devices can include, but are not limited to, a wall outlet, a control device for adjusting a vent baffle, a projector, a computer, and a telephone.

As defined herein, a floorplan is a spatial record of locations of assets (e.g., light fixtures, walls, doors, furniture). A floorplan can be for an indoor volume of space or an outdoor volume of space. The recording of a floorplan can be in two dimensions or three dimensions. A floorplan can be physical (e.g., printed on a piece of paper) or virtual (a digital representation shown on a display).

Also, as defined herein, autocommissioning is a term used to represent the automatic commissioning of assets in a volume of space (within a floorplan). Autocommissioning involves transferring one or more parameters (e.g., settings, instructions) to an asset. Upon receipt of those parameters, the asset follows the parameters to initiate itself so that the asset can begin operations. Such parameters can be native (directed) to the asset (for example, sensors available for the asset, light level that can be output by the asset, power output of the asset, temperature at which the asset can operate, extra I/O functions like speaker system and microphone capability of the asset). In addition, or in the alternative, such parameters can be native (directed) to the volume of space (for example, floor reflectivity, direction of the dominant contributor of sunlight, skylights, solatubes, emergency exit route). For example, parameters for an emergency exit route would be important in case the assets along the route must illuminate the exit route during a fire, or illuminate an assembly area during a storm.

When the system is a lighting system and the equipment includes light fixtures, such light fixtures can use one or more of a number of different types of light sources, including but not limited to light-emitting diode (LED) light sources, fluorescent light sources, organic LED light sources, incandescent light sources, and halogen light sources. Therefore, equipment that are light fixtures used in example embodiments described herein should not be considered limited to using a particular type of light source.

In general, example embodiments provide systems, methods, and devices for auto-commissioning of electrical equipment in a system, and for mapping the position of equipment (whether electrical or not) within a volume of space. A piece of equipment can also be called an asset herein. A piece of equipment (e.g., a light fixture, a wall outlet, a telephone, a printer) that operates on electricity can be referred to herein as a device or an electrical device. A piece of equipment (e.g., a wall, a chair, a bookcase, a file cabinet) that does not operate on electricity can be referred to herein as an object.

A floorplan developed using example embodiments can include any type of asset, including electrical devices and/or objects. Using example CAFC devices provides a number of benefits. Such benefits can include, but are not limited to, reduced costs and resources for commissioning activities, more effective and thorough commissioning, improved safety, immediate tracking of assets, and compliance with industry standards that apply to electrical equipment and certain (e.g., lighting) systems. For example, using example embodiments to locate passive objects can assist in identifying where electrical devices are located when implementing an asset tracking function within the system.

The example CAFC devices capable of auto-commissioning (or components thereof, including controllers) described herein can be made of one or more of a number of suitable materials. Examples of such materials can include, but are not limited to, aluminum, stainless steel, fiberglass, glass, plastic, ceramic, and rubber. Further, such CAFC devices and/or other associated components can meet certain standards and/or regulations.

In the foregoing figures showing example embodiments of CAFC devices, one or more of the components shown may be omitted, repeated, and/or substituted. Accordingly, example embodiments of CAFC devices should not be considered limited to the specific arrangements of components shown in any of the figures. For example, features shown in one or more figures or described with respect to one embodiment can be applied to another embodiment associated with a different figure or description.

While example embodiments described herein are directed to stand-alone equipment, example embodiments can also be applied to any devices and/or components disposed within an electrical or other enclosure. As defined herein, an electrical enclosure is any type of cabinet or housing inside of which is disposed electrical, mechanical, electro-mechanical, and/or electronic equipment. Such equipment can include, but is not limited to, a controller (also called a control module), a hardware processor, a power supply (e.g., a battery, a driver, a ballast), a sensor module, a sensor, sensor circuitry, a light source, electrical cables, and electrical conductors. Examples of an electrical enclosure can include, but are not limited to, a housing for a light fixture, a housing for a sensor device, an electrical connector, a junction box, a motor control center, a breaker box, an electrical housing, a conduit, a control panel, an indicating panel, and a control cabinet.

In certain example embodiments, CAFC devices used for auto-commissioning and/or mapping in a volume of space are subject to meeting certain standards and/or requirements. For example, the National Electric Code (NEC), the National Electrical Manufacturers Association (NEMA), the International Electrotechnical Commission (IEC), the Federal Communication Commission (FCC), the Illuminating Engineering Society (IES), and the Institute of Electrical and Electronics Engineers (IEEE) set standards as to electrical enclosures, wiring, and electrical connections. Use of example embodiments described herein meet (and/or allow a corresponding device to meet) such standards when required. In some (e.g., PV solar) applications, additional standards particular to that application may be met by the electrical enclosures described herein.

If a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. The numbering scheme for the various components in the figures herein is such that each component is a three digit number and corresponding components in other figures have the identical last two digits.

Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

Example embodiments of CAFC devices will be described more fully hereinafter with reference to the accompanying drawings, in which example embodiments of CAFC devices are shown. CAFC devices may, however, be embodied in many different forms and should not be construed as limited to the example embodiments set forth herein. Rather, these example embodiments are provided so that this disclosure will be thorough and complete, and will fully convey the scope of CAFC devices to those of ordinary skill in the art. Like, but not necessarily the same, elements (also sometimes called components) in the various figures are denoted by like reference numerals for consistency.

Terms such as "first", "second", and "within" are used merely to distinguish one component (or part of a component or state of a component) from another. Such terms are not meant to denote a preference or a particular orientation, and are not meant to limit embodiments of CAFC devices. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

FIG. 1 shows a diagram of a system 100 that includes an automated CAFC system 104 of a CAFC device 102 in accordance with certain example embodiments. The system 100 can include a user 150, a network manager 180, and at least one other piece of equipment 190 (e.g., equipment 190-1, equipment 190-N). In addition to the CAFC system 104, the CAFC device 102 can include a power supply 140, one or more sensors 160 (also sometimes called sensor modules 160 or sensor devices 160), and one or more of a number of mobility features 142.

The CAFC system 104 can include one or more of a number of components. Such components, can include, but are not limited to, a CAFC engine 106, a communication module 108, a timer 110, an energy metering module 111, a power module 112, a storage repository 130, a hardware processor 120, a memory 122, a transceiver 124, an application interface 126, and, optionally, a security module 128. The components shown in FIG. 1 are not exhaustive, and in some embodiments, one or more of the components shown in FIG. 1 may not be included in an example CAFC device. Any component of the example CAFC device 102 can be discrete or combined with one or more other components of the CAFC device 102.

A user 150 may be any person that interacts with CAFC devices. Examples of a user may include, but are not limited to, an engineer, an electrician, an instrumentation and controls technician, a mechanic, an implementation engineer, an inventory management system, an inventory manager, a foreman, a labor scheduling system, a contractor, and a manufacturer's representative. The user 150 can use a user system (not shown), which may include a display (e.g., a GUI). The user 150 interacts with (e.g., sends data to, receives data from) the CAFC system 104 of the CAFC device 102 via the application interface 126 (described below). The user 150 can also interact with a network manager 180 and/or any of the equipment 190 (e.g., equipment 190-1, equipment 190-N) in the system 100. Interaction between the user 150 and the CAFC devices 102 (or components thereof, such as the CAFC system 104 and a sensor 160), the equipment 190, and/or the network manager 180 is conducted using communication links 105. Each communication link 105 can include wired (e.g., Class 1 electrical cables, Class 2 electrical cables, electrical connectors, power line carrier, DALI, RS485) and/or wireless (e.g., Wi-Fi, visible light communication, cellular networking, UART, SPI, I2C, visible light communication (VLC), 802.15.4 wireless, ZigBee, 4G cellular wireless, Bluetooth, WirelessHART, ISA100) technology. For example, a communication link 105 can be (or include) one or more electrical conductors that are coupled to the housing 103 of a CAFC device 102. The communication link 105 can transmit signals (e.g., power signals, communication signals, control signals, data) between the CAFC device 102, the equipment 190, the user 150, and/or the network manager 180.

The network manager 180 is a device or component that controls all or a portion of a communication network that includes the CAFC system 104 of the CAFC device 102 and the equipment 190 (including components thereof) that are communicably coupled to the CAFC system 104. The network manager 180 can be substantially similar to the CAFC system 104. Alternatively, the network manager 180 can include one or more of a number of features in addition to, or altered from, the features of the CAFC system 104 described below. As described herein, communication with the network manager 180 can include communicating with one or more other components (e.g., another CAFC device 102) of the system 100. In such a case, the network manager 180 can facilitate such communication.

The one or more sensors 160 can be any type of sensing device that measures one or more parameters. Examples of types of sensors 160 can include, but are not limited to, a passive infrared sensor, a photocell, a pressure sensor, a proximity sensor, a SONAR sensor, a LIDAR sensor, a seismic sensor, a camera, a global positioning system, a gyroscope, a magnetometer, an accelerometer, and an air flow monitor. A parameter that can be measured by a sensor 160 can include, but is not limited to, motion, light, and time. In some cases, the parameter or parameters measured by a sensor 160 can be used by the CAFC device 102 to commission and/or map some or all of the equipment 190. Examples of a parameter measured by a sensor 160 can include, but are not limited to, movement, presence of an object, temperature, electrical power, a magnetic field, and distance.

Each sensor 160 can use one or more of a number of communication protocols. A sensor 160 can be associated with one or more pieces of equipment 190 in the system 100. A sensor 160 can be located within the housing 103 of the CAFC device 102, disposed on the housing 103 of the CAFC device 102, or located outside the housing 103 of the CAFC device 102. A sensor 160 can be part of, or separate from, the CAFC system 104. In certain example embodiments, a sensor 160 can include a battery that is used to provide power, at least in part, to some or all of the rest of the sensor 160.

The user 150, the network manager 180, and/or the equipment 190 can interact with the CAFC system 104 of the CAFC device 102 using the application interface 126 in accordance with one or more example embodiments. Specifically, the application interface 126 of the CAFC system 104 receives data (e.g., information, communications, instructions, updates to firmware) from and sends data (e.g., information, communications, instructions) to the user 150, the network manager 180, and/or one or more pieces of equipment 190. The user 150, the network manager 180, and/or each piece of equipment 190 can include an interface to receive data from and send data to the CAFC system 104 in certain example embodiments. Examples of such an interface can include, but are not limited to, a graphical user interface, a touchscreen, an application programming interface, a keyboard, a monitor, a mouse, a web service, a data protocol adapter, some other hardware and/or software, or any suitable combination thereof.

The CAFC system 104, the user 150, the network manager 180, and/or the equipment 190 can use their own system or share a system in certain example embodiments. Such a system can be, or contain a form of, an Internet-based or an intranet-based computer system that is capable of communicating with various software. A computer system includes any type of computing device and/or communication device, including but not limited to the CAFC system 104. Examples of such a system can include, but are not limited to, a desktop computer with a Local Area Network (LAN), a Wide Area Network (WAN), Internet or intranet access, a laptop computer with LAN, WAN, Internet or intranet access, a smart phone, a server, a server farm, an android device (or equivalent), a tablet, smartphones, and a personal digital assistant (PDA). Such a system can correspond to a computer system as described below with regard to FIG. 2.

Further, as discussed above, such a system can have corresponding software (e.g., user software, CAFC system software, network manager software). The software can execute on the same or a separate device (e.g., a server, mainframe, desktop personal computer (PC), laptop, PDA, television, cable box, satellite box, kiosk, telephone, mobile phone, or other computing devices) and can be coupled by the communication network (e.g., Internet, Intranet, Extranet, LAN, WAN, or other network communication methods) and/or communication channels, with wire and/or wireless segments according to some example embodiments. The software of one system can be a part of, or operate separately but in conjunction with, the software of another system within the system 100. The CAFC device 102 can include a housing 103. The housing 103 can include at least one wall that forms a cavity 101. In some cases, the housing can be designed to comply with any applicable standards so that the CAFC device 102 can be located in a particular environment (e.g., a hazardous environment).

The housing 103 of the CAFC device 102 can be used to house one or more components of the CAFC device 102, including one or more components of the CAFC system 104. For example, as shown in FIG. 1, the CAFC system 104 (which in this case includes the CAFC engine 106, the communication module 108, the timer 110, the energy metering module 111, the power module 112, the storage repository 130, the hardware processor 120, the memory 122, the transceiver 124, the application interface 126, and the optional security module 128), the power supply 140, and the mobility features 142 are disposed in the cavity 101 formed by the housing 103 or integrated with the housing 103. In alternative embodiments, any one or more of these and/or other components of the CAFC device 102 can be disposed on the housing 103 and/or remotely from the housing 103.

The storage repository 130 can be a persistent storage device (or set of devices) that stores software and data used to assist the CAFC system 104 in communicating with the user 150, the network manager 180, and the equipment 190 within the system 100. In one or more example embodiments, the storage repository 130 stores one or more protocols 132, algorithms 133, and stored data 134. The protocols 132 can be any of a number of communication protocols that are used to send and/or receive data between the CAFC system 104 and the user 150, the network manager 180, and the equipment 190. A protocol 132 can also include a process for auto-commissioning the equipment 190 in the system 100 and/or mapping the equipment 190 in a volume of space using the CAFC device 102. One or more of the protocols 132 can be a time-synchronized protocol. Examples of such time-synchronized protocols can include, but are not limited to, a highway addressable remote transducer (HART) protocol, a wirelessHART protocol, and an International Society of Automation (ISA) 100 protocol. In this way, one or more of the protocols 132 can provide a layer of security to the data transferred within the system 100.

The algorithms 133 can be any procedures (e.g., a series of method steps), formulas, logic steps, mathematical models, and/or other similar operational procedures that the CAFC engine 106 of the CAFC system 104 follows based on certain conditions at a point in time. An example of an algorithm 133 is identifying (e.g., using one or more of the sensors 160) the equipment 190, commissioning some or all of the equipment 190, determining (e.g., using an algorithm 133) the position of the equipment 190 in the volume of space, and storing (e.g., using the stored data 134 in the storage repository 130) the data associated with these activities.

For example, there can be one or more algorithms 133 that calculate a distance from a piece of equipment (e.g., equipment 190-1) to the CAFC device 102 based on the amount of time 190 (e.g., measured by the timer 110) it takes a signal to travel between the CAFC device 102 and the piece of equipment 190-1. In addition, or in the alternative, an algorithm 133 used to determine a distance from a piece of equipment 190 to the CAFC device 102 can be based on some factor (e.g., angle of arrival, angle of departure) not strictly associated with time. An algorithm 133 can be fixed or modified (e.g., by a user 150, by the CAFC engine 106) over time. Modification of an algorithm 133 can be based on one or more of a number of factors, including but not limited to new equipment 190, a new transceiver 124, and correction based on actual data.

One or more algorithms 133 and/or one or more protocols 132 can also be used to determine the path traveled by the CAFC device 102 while the CAFC device 102 operates (e.g., commissions the equipment 190, locates the equipment 190) in the volume of space. For example, an algorithm 133 and/or a protocol 132 can alter a direction of travel of the CAFC device 102 based on the presence (e.g., as detected by one or more sensors 160, based on a floorplan stored in the storage repository 130) of an object (e.g., a wall, a table, a piece of equipment 190) in the volume of space.

Stored data 134 can be any data (e.g., processing speed) associated with the CAFC device 102 (including other CAFC devices 102 and/or any components thereof), any data associated with the equipment 190, any measurements taken by the sensors 160, measurements taken by the energy metering module 111 and/or the sensors 160, a floorplan, threshold values, results of previously run or calculated algorithms, and/or any other suitable data. Such data can be any type of data, including but not limited to historical data for the equipment 190, historical data for other CAFC devices 102, calculations, an identification number of the equipment 190, measurements taken by the energy metering module 111, and measurements taken by one or more sensors 160. The stored data 134 can be associated with some measurement of time derived, for example, from the timer 110.

Examples of a storage repository 130 can include, but are not limited to, a database (or a number of databases), a file system, a hard drive, flash memory, some other form of solid state data storage, the cloud, or any suitable combination thereof. The storage repository 130 can be located on multiple physical machines (e.g., the CAFC system 104, the network manager 180, the cloud), each storing all or a portion of the protocols 132, the algorithms 133, and/or the stored data 134 according to some example embodiments. Each storage unit or device can be physically located in the same or in a different geographic location.

The storage repository 130 can be operatively connected to the CAFC engine 106. In one or more example embodiments, the CAFC engine 106 includes functionality to communicate with the user 150, the network manager 180, and the equipment 190 in the system 100. More specifically, the CAFC engine 106 sends information to and/or receives information from the storage repository 130 in order to communicate with the user 150, the network manager 180, and the equipment 190. As discussed below, the storage repository 130 can also be operatively connected to the communication module 108 in certain example embodiments.

In certain example embodiments, the CAFC engine 106 of the CAFC system 104 controls the operation of one or more components (e.g., the communication module 108, the timer 110, the transceiver 124) of the CAFC system 104. For example, the CAFC engine 106 can activate the communication module 108 when the communication module 108 is in "sleep" mode and when the communication module 108 is needed to send data received from another component (e.g., the equipment 190, the user 150) in the system 100.

As another example, the CAFC engine 106 can acquire the current time using the timer 110. The timer 110 can enable the CAFC system 104 to control the CAFC device 102 even when the CAFC system 104 has no communication with the network manager 180. As yet another example, the CAFC engine 106 can direct the energy metering module 111 to measure and send power consumption information of the CAFC device 102 to the network manager 180. In some cases, the CAFC engine 106 of the CAFC system 104 can generate and send a signal to the power supply 140, which causes one or more of the mobility features 142 to operate.

The CAFC engine 106 can be configured to perform a number of functions that help the CAFC device 102 (or components thereof) automatically commission some or all of the equipment 190 in the system 100. The CAFC engine 106 can be configured to perform a number of functions that help the CAFC device 102 (or components thereof) map equipment (assets) in a volume of space. As discussed above, the CAFC engine 106 can execute any of the protocols 132 and/or the algorithms 133, using stored data 134 stored in the storage repository 130, to automatically commission the equipment 190 and/or to map the equipment 190. In certain example embodiments, the CAFC engine 106 controls the frequency at which a signal is sent to another CAFC device 102 in the system 100.

In certain example embodiments, the CAFC engine 106 of the CAFC device 102 can execute an identification algorithm 133 that enables the CAFC engine 106 to understand which type of asset is nearby and capable of commissioning (e.g., an electrical device). The identification of an asset can be performed in one or more of a number of ways, including but not limited to image processing (e.g., capture, recognition), wireless communication (e.g., zigbee, Bluetooth, ble, lora, etc), wireless beacons, asset communication, barcode, qr code, datamatrix, IR, NFC, spatial or volumetric analysis of the asset). After identifying the asset, the CAFC engine 106 can use one or more of the algorithms 133 and/or protocols 132, acts as an intermediary for the network manager 180, and/or update its firmware in order to store remote commissioning algorithms 133 into its local storage repository 130.

The CAFC engine 106 can provide control, communication, and/or other similar signals to the user 150, the network manager 180, and one or more pieces of the equipment 190. Similarly, the CAFC engine 106 can receive control, communication, and/or other similar signals from the user 150, the network manager 180, and one or more pieces of the equipment 190. The CAFC engine 106 can control each sensor 160 automatically (for example, based on one or more protocols 132 or algorithms 133 stored in the CAFC engine 106) and/or based on control, communication, and/or other similar signals received from another device through a communication link 105. The CAFC engine 106 may include a printed circuit board, upon which the hardware processor 120 and/or one or more discrete components of the CAFC system 104 are positioned.

In certain embodiments, the CAFC engine 106 of the CAFC system 104 can communicate with one or more components of a system external to the system 100 in furtherance of commissioning the equipment 190 and/or mapping the equipment 190 within a volume of space in the system 100. For example, the CAFC engine 106 can interact with an inventory management system by ordering a replacement part for a piece of equipment 190 that the CAFC engine 106 has determined to fail or be failing. As another example, the CAFC engine 106 can interact with a workforce scheduling system by scheduling a maintenance crew to repair or replace a piece of equipment 190 (or portion thereof) when the CAFC engine 106 determines that the piece of equipment 190 or portion thereof requires maintenance or replacement. In this way, the CAFC system 104 is capable of performing a number of functions beyond what could reasonably be considered a routine task.

In certain example embodiments, the CAFC engine 106 can include an interface that enables the CAFC engine 106 to communicate with one or more components (e.g., power supply 140) of the CAFC device 102. For example, if the power supply 140 of the CAFC device 102 operates under IEC Standard 62386, then the power supply 140 can have a serial communication interface that will transfer data (e.g., stored data 134) measured by the sensors 160. In such a case, the CAFC engine 106 can also include a serial interface to enable communication with the power supply 140 within the CAFC device 102. Such an interface can operate in conjunction with, or independently of, the protocols 132 used to communicate between the CAFC system 104 and the user 150, the network manager 180, and the equipment 190.

The CAFC engine 106 (or other components of the CAFC system 104) can also include one or more hardware components and/or software elements to perform its functions. Such components can include, but are not limited to, a universal asynchronous receiver/transmitter (UART), a serial peripheral interface (SPI), a direct-attached capacity (DAC) storage device, an analog-to-digital converter, an inter-integrated circuit ($I^2C$), and a pulse width modulator (PWM).

The communication module 108 of the CAFC system 104 determines and implements the communication protocol (e.g., from the protocols 132 of the storage repository 130) that is used when the CAFC engine 106 communicates with (e.g., sends signals to, receives signals from) the user 150, the network manager 180, and/or one or more pieces of equipment 190. In some cases, the communication module 108 accesses the stored data 134 to determine which communication protocol is used to communicate with a piece of equipment 190 associated with the stored data 134. In addition, the communication module 108 can interpret the communication protocol of a communication received by the CAFC system 104 so that the CAFC engine 106 can interpret the communication.

The communication module 108 can send and receive data between the network manager 180, the sensors 160, the equipment 190, and/or the users 150 and the CAFC system 104. The communication module 108 can send and/or receive data in a given format that follows a particular protocol 132. The CAFC engine 106 can interpret the data packet received from the communication module 108 using the protocol 132 information stored in the storage repository 130. The CAFC engine 106 can also facilitate the data transfer between one or more sensors 160 and the network manager 180, the equipment 190, and/or a user 150 by converting the data into a format understood by the communication module 108.

The communication module 108 can send data (e.g., protocols 132, algorithms 133, stored data 134, operational information, alarms) directly to and/or retrieve data directly from the storage repository 130. Alternatively, the CAFC engine 106 can facilitate the transfer of data between the communication module 108 and the storage repository 130. The communication module 108 can also provide encryption to data that is sent by the CAFC system 104 and decryption to data that is received by the CAFC system 104. The communication module 108 can also provide one or more of a number of other services with respect to data sent from and received by the CAFC system 104. Such services can include, but are not limited to, data packet routing information and procedures to follow in the event of data interruption.

The timer 110 of the CAFC system 104 can track clock time, intervals of time, an amount of time, and/or any other measure of time. The timer 110 can also count the number of occurrences of an event, whether with or without respect to time. Alternatively, the CAFC engine 106 can perform the counting function. The timer 110 is able to track multiple time measurements concurrently. The timer 110 can track time periods based on an instruction received from the CAFC engine 106, based on an instruction received from the user 150, based on an instruction programmed in the software for the CAFC system 104, based on some other condition or from some other component, or from any combination thereof.

The timer 110 can be configured to track time when there is no power delivered to the CAFC system 104 (e.g., the power module 112 malfunctions) using, for example, a super capacitor or a battery backup. In such a case, when there is a resumption of power delivery to the CAFC system 104, the timer 110 can communicate any aspect of time to the CAFC system 104. In such a case, the timer 110 can include one or more of a number of components (e.g., a super capacitor, an integrated circuit) to perform these functions.

The energy metering module 111 of the CAFC system 104 measures one or more components of energy (e.g., magnetic field strength, heat, electromagnetic waves, electrical current, electrical voltage, resistance, VARs, watts) at one or more points in a volume of space and/or within the CAFC device 102. The energy metering module 111 can include any of a number of measuring devices and related devices, including but not limited to a voltmeter, an infrared detector, an ammeter, a power meter, an ohmmeter, a current transformer, a potential transformer, and electrical wiring. The energy metering module 111 can measure a component of energy continuously, periodically, based on the occurrence of an event, based on a command received from the control module 106, and/or based on some other factor. The energy metering module 111 can be part of, or separate from, the sensors 160.

The power module 112 of the CAFC system 104 provides power to one or more other components (e.g., timer 110, CAFC engine 106) of the CAFC system 104. In addition, in certain example embodiments, the power module 112 can provide power to the power supply 140 of the CAFC device 102. The power module 112 can include one or more of a number of single or multiple discrete components (e.g., transistor, diode, resistor), and/or a microprocessor. The power module 112 may include a printed circuit board, upon which the microprocessor and/or one or more discrete components are positioned. In some cases, the power module 112 can include one or more components that allow the power module 112 to measure one or more elements of power (e.g., voltage, current) that is delivered to and/or sent from the power module 112, Alternatively, the power metering module 111 can measure one or more elements of power that flows into, out of, and/or within the CAFC system 104.

The power module 112 can include one or more components (e.g., a transformer, a diode bridge, an inverter, a converter) that receives power (for example, through an electrical cable) from a source external to the CAFC device 102 and generates power of a type (e.g., alternating current, direct current) and level (e.g., 12V, 24V, 120V) that can be used by the other components of the CAFC system 104 and/or by the power supply 140. The power module 112 can use a closed control loop to maintain a preconfigured voltage or current with a tight tolerance at the output. The power module 112 can also protect the rest of the electronics (e.g., hardware processor 120, transceiver 124) in the CAFC device 102 from surges generated in the line.

In addition, or in the alternative, the power module 112 can be a source of power in itself to provide signals to the other components of the CAFC system 104 and/or the power supply 140. For example, the power module 112 can be or include a battery. As another example, the power module 112 can be or include a localized photovoltaic power system. The power module 112 can also have sufficient isolation in the associated components of the power module 112 (e.g., transformers, opto-couplers, current and voltage limiting devices) so that the power module 112 is certified to provide power to an intrinsically safe circuit.

In certain example embodiments, the power module 112 of the CAFC system 104 can also provide power and/or control signals, directly or indirectly, to one or more of the sensors 160. In such a case, the CAFC engine 106 can direct the power generated by the power module 112 to the sensors 160 and/or the power supply 140 of the CAFC device 102. In this way, power can be conserved by sending power to the sensors 160 and/or the power supply 140 of the CAFC device 102 when those devices need power, as determined by the CAFC engine 106.

The hardware processor 120 of the CAFC system 104 executes software, algorithms, and firmware in accordance with one or more example embodiments. Specifically, the hardware processor 120 can execute software on the CAFC engine 106 or any other portion of the CAFC system 104, as well as software used by the user 150, the network manager 180, one or more pieces of equipment 190, and/or one or more of the sensors 160. The hardware processor 120 can be an integrated circuit, a central processing unit, a multi-core processing chip, SoC, a multi-chip module including multiple multi-core processing chips, or other hardware processor in one or more example embodiments. The hardware processor 120 is known by other names, including but not limited to a computer processor, a microprocessor, and a multi-core processor.

In one or more example embodiments, the hardware processor 120 executes software instructions stored in memory 122. The memory 122 includes one or more cache memories, main memory, and/or any other suitable type of memory. The memory 122 can include volatile and/or non-volatile memory. The memory 122 is discretely located within the CAFC system 104 relative to the hardware processor 120 according to some example embodiments. In certain configurations, the memory 122 can be integrated with the hardware processor 120.

In certain example embodiments, the CAFC system 104 does not include a hardware processor 120. In such a case, the CAFC system 104 can include, as an example, one or more field programmable gate arrays (FPGA), one or more integrated-gate bipolar transistors (IGBTs), and/or one or more integrated circuits (ICs). Using FPGAs, IGBTs, ICs, and/or other similar devices known in the art allows the CAFC system 104 (or portions thereof) to be programmable and function according to certain logic rules and thresholds without the use of a hardware processor. Alternatively, FPGAs, IGBTs, ICs, and/or similar devices can be used in conjunction with one or more hardware processors 120.

The transceiver 124 of the CAFC system 104 can send and/or receive control and/or communication signals. Specifically, the transceiver 124 can be used to transfer data between the CAFC system 104 and the user 150, the network manager 180, one or more pieces of equipment 190, and/or the sensors 160 (e.g., if remote from the CAFC device 102). The transceiver 124 can use wired and/or wireless technology. The transceiver 124 can be configured in such a way that the control and/or communication signals sent and/or received by the transceiver 124 can be received and/or sent by another transceiver that is part of the user 150, the network manager 180, one or more pieces of equipment 190, and/or the sensors 160. The transceiver 124 can use any of a number of signal types, including but not limited to radio frequency signals.

When the transceiver 124 uses wireless technology, any type of wireless technology can be used by the transceiver 124 in sending and receiving signals. Such wireless technology can include, but is not limited to, Wi-Fi, visible light communication (VLC), cellular networking, UART, SPI, I2C, 802.15.4 wireless, ZigBee, 4G cellular wireless, and Bluetooth. The transceiver 124 can use one or more of any number of suitable communication protocols (e.g., ISA100, HART) when sending and/or receiving signals. Such communication protocols can be stored in the protocols 132 of the storage repository 130. Further, any transceiver information for the user 150, the network manager 180, and/or the sensors 160 can be part of the stored data 134 (or similar areas) of the storage repository 130.

Optionally, in one or more example embodiments, the security module 128 secures interactions between the CAFC system 104, the user 150, the network manager 180, and/or the sensors 160. More specifically, the security module 128 authenticates communication from software based on security keys verifying the identity of the source of the communication. For example, user software may be associated with a security key enabling the software of the user 150 to interact with the CAFC system 104 and/or the sensors 160. Further, the security module 128 can restrict receipt of information, requests for information, and/or access to information in some example embodiments.

As mentioned above, aside from the CAFC system 104 and its components, the CAFC device 102 can include a power supply 140 and one or more mobility features 142. The mobility features 142 of the CAFC device 102 are devices and/or components that allow the CAFC device 102 to move. The CAFC device 102 can have one or more of any number and/or type of mobility features 142. Examples of such mobility features 142 can include, but are not limited to, wheels, propellers, caterpillar tracks, grippers, spikes, anchors, motors, axels, gears, a local control module, a heat sink, an electrical conductor or electrical cable, a terminal block, a drive train, and a circuit board. In this way, the CAFC device 102 can move along the ground, through the air, up a wall, along a ceiling, over furniture or other obstacles in a volume of space, in some other fashion, or any combination thereof. The CAFC device 102 can be a car, a drone, a hovercraft, or any other type of movable device.

The power supply 140 of the CAFC device 102 provides power to one or more of the mobility features 142. The power supply 140 can be called by any of a number of other names, including but not limited to a driver and a power source. The power supply 140 can be substantially the same as, or different than, the power module 112 of the CAFC system 104. The power supply 140 can include one or more of a number of single or multiple discrete components (e.g., transistor, diode, resistor), and/or a microprocessor. The power supply 140 may include a printed circuit board, upon which the microprocessor and/or one or more discrete components are positioned, and/or a dimmer.

The power supply 140 can include one or more components (e.g., a transformer, a diode bridge, an inverter, a converter) that receives power (for example, through an electrical cable) from the power module 112 of the CAFC system 104 and generates power of a type (e.g., alternating current, direct current) and level (e.g., 12V, 24V, 120V) that can be used by the mobility features 142. In addition, or in the alternative, the power supply 140 can receive power from a source external to the CAFC device 102. In addition, or in the alternative, the power supply 140 can be a source of power in itself. For example, the power supply 140 can be a battery, a localized photovoltaic power system, or some other source of independent power.

As stated above, the CAFC device 102 can be used in any of a number of environments. In such a case, the housing 103 of the CAFC device 102 can be configured to comply with applicable standards for any of a number of environments. For example, the CAFC device 102 can be rated as a Division 1 or a Division 2 enclosure under NEC standards. Similarly, any of the sensors 160, equipment 190, and/or other devices communicably coupled to the CAFC device 102 can be configured to comply with applicable standards for any of a number of environments. For example, a sensor 160 can be rated as a Division 1 or a Division 2 enclosure under NEC standards.

Figure 2:
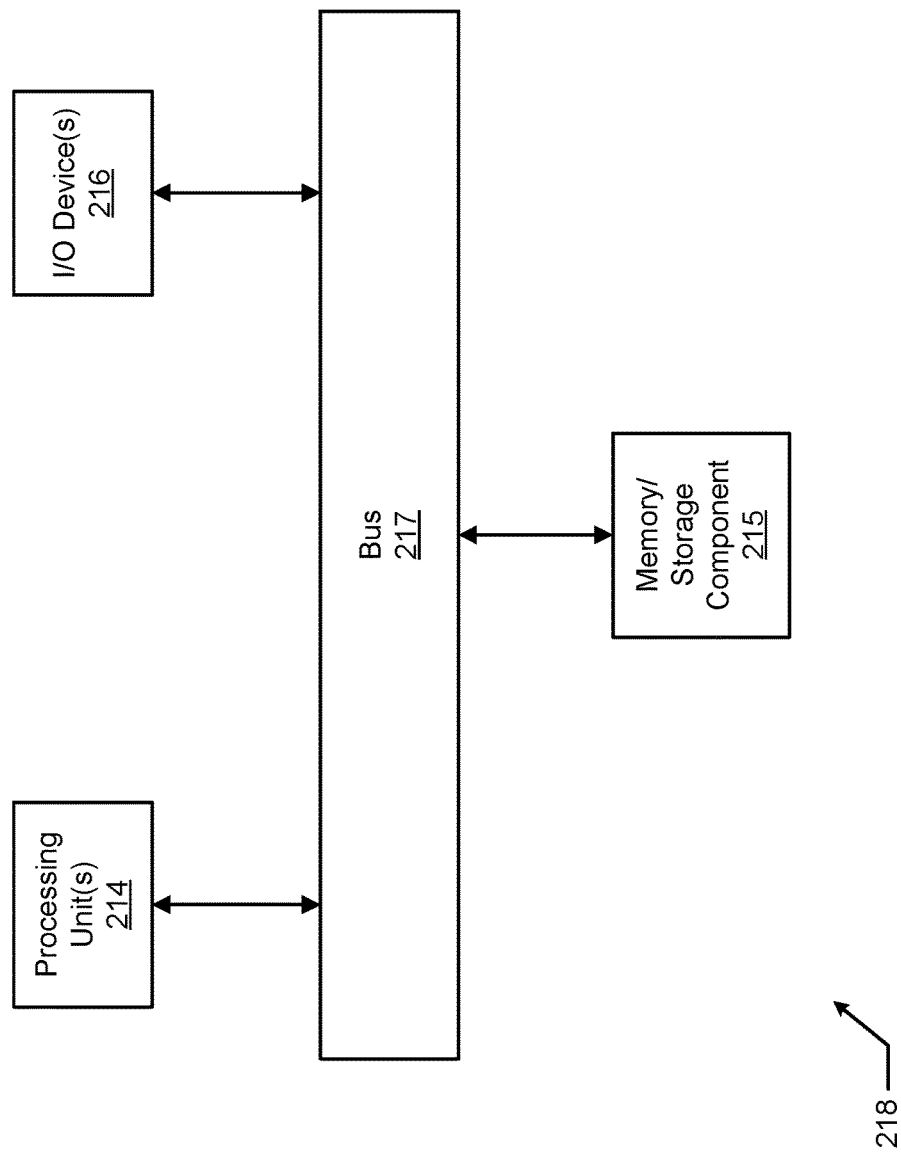
FIG. 2 shows a computing device in accordance with certain example embodiments.

FIG. 2 illustrates one embodiment of a computing device 218 that implements one or more of the various techniques described herein, and which is representative, in whole or in part, of the elements described herein pursuant to certain exemplary embodiments. Computing device 218 is one example of a computing device and is not intended to suggest any limitation as to scope of use or functionality of the computing device and/or its possible architectures. Neither should computing device 218 be interpreted as having any dependency or requirement relating to any one or combination of components illustrated in the example computing device 218.

Computing device 218 includes one or more processors or processing units 214, one or more memory/storage components 215, one or more input/output (I/O) devices 216, and a bus 217 that allows the various components and devices to communicate with one another. Bus 217 represents one or more of any of several types of bus structures, including a memory bus or memory controller, a peripheral bus, an accelerated graphics port, and a processor or local bus using any of a variety of bus architectures. Bus 217 includes wired and/or wireless buses.

Memory/storage component 215 represents one or more computer storage media. Memory/storage component 215 includes volatile media (such as random access memory (RAM)) and/or nonvolatile media (such as read only memory (ROM), flash memory, optical disks, magnetic disks, and so forth). Memory/storage component 215 includes fixed media (e.g., RAM, ROM, a fixed hard drive, etc.) as well as removable media (e.g., a Flash memory drive, a removable hard drive, an optical disk, and so forth).

One or more I/O devices 216 allow a customer, utility, or other user to enter commands and information to computing device 218, and also allow information to be presented to the customer, utility, or other user and/or other components or devices. Examples of input devices include, but are not limited to, a keyboard, a cursor control device (e.g., a mouse), a microphone, a touchscreen, and a scanner. Examples of output devices include, but are not limited to, a display device (e.g., a monitor or projector), speakers, outputs to a lighting network (e.g., DMX card), a printer, and a network card.

Various techniques are described herein in the general context of software or program modules. Generally, software includes routines, programs, objects, components, data structures, and so forth that perform particular tasks or implement particular abstract data types. An implementation of these modules and techniques are stored on or transmitted across some form of computer readable media. Computer readable media is any available non-transitory medium or non-transitory media that is accessible by a computing device. By way of example, and not limitation, computer readable media includes "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which is used to store the desired information and which is accessible by a computer.

The computer device 218 is connected to a network (not shown) (e.g., a LAN, a WAN such as the Internet, cloud, or any other similar type of network) via a network interface connection (not shown) according to some exemplary embodiments. Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means take other forms, now known or later developed, in other exemplary embodiments. Generally speaking, the computer system 218 includes at least the minimal processing, input, and/or output means necessary to practice one or more embodiments.

Further, those skilled in the art will appreciate that one or more elements of the aforementioned computer device 218 is located at a remote location and connected to the other elements over a network in certain exemplary embodiments. Further, one or more embodiments is implemented on a distributed system having one or more nodes, where each portion of the implementation (e.g., CAFC engine 106) is located on a different node within the distributed system. In one or more embodiments, the node corresponds to a computer system. Alternatively, the node corresponds to a processor with associated physical memory in some exemplary embodiments. The node alternatively corresponds to a processor with shared memory and/or resources in some exemplary embodiments.

Figure 3:
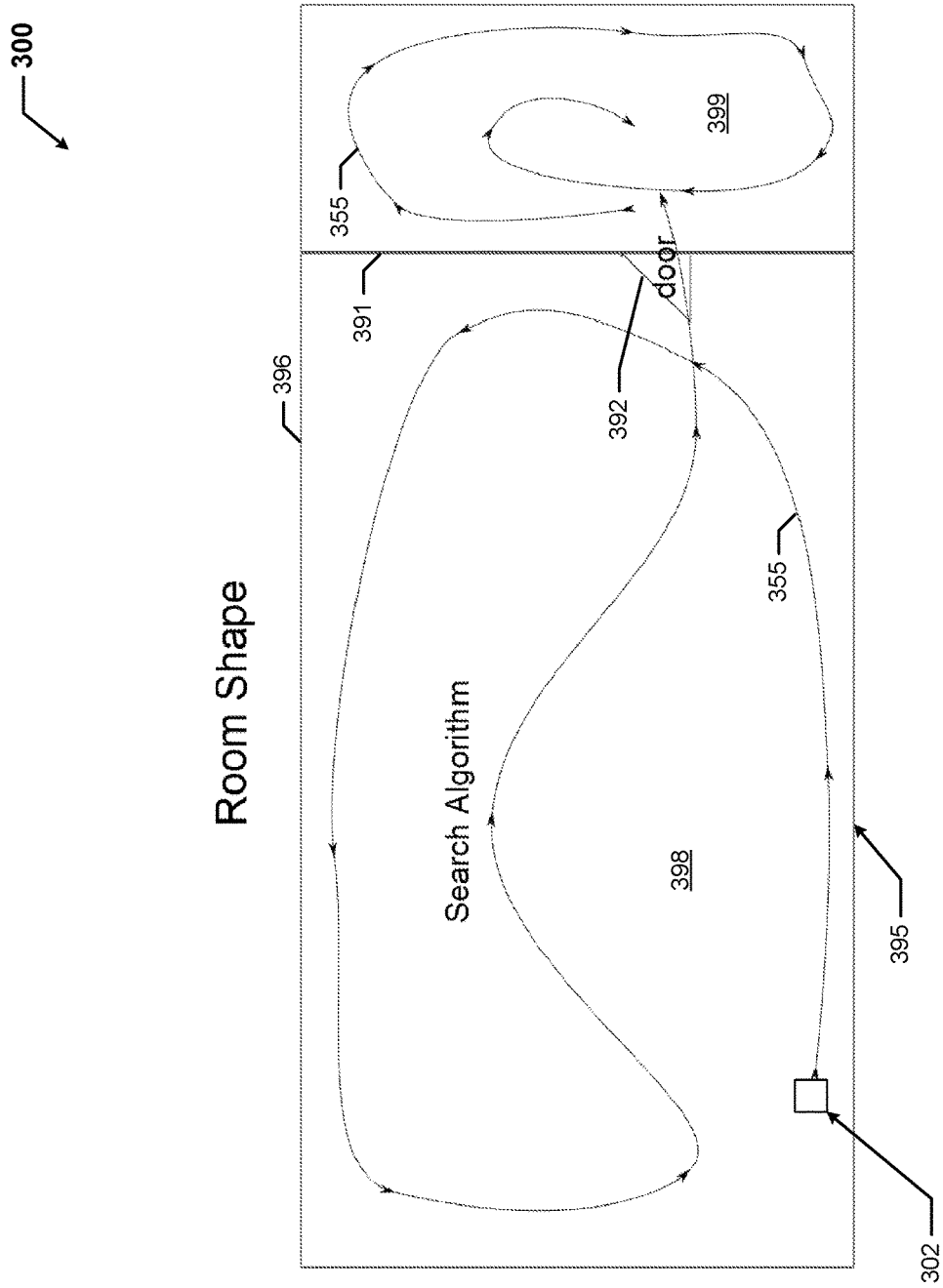
FIG. 3 shows a system that includes a CAFC device located in a volume of space in accordance with certain example embodiments.

FIG. 3 shows a system 300 that includes a CAFC device 302 located in a volume of space 395 in accordance with certain example embodiments. The volume of space 390 can be any interior and/or exterior space in which one or more CAFC devices 302 can be located for auto-commissioning of equipment and/or for mapping the volume of space 395. In this case, the volume of space 395 is part of an office space that is defined by exterior walls 396 that form the rectangular outer perimeter of the volume of space 395. The volume of space 395 in this case is divided into two rooms (room 398 and room 399) that are divided from each other by a wall 391 and adjoined to each other by a door 392.

The CAFC device 302 travels on a path 355 throughout the volume of space 395 (and in particular in this case, throughout room 398 and room 399). The path 355 can be based on an algorithm (e.g., algorithms 133), based on equipment (e.g., tables, walls, light fixtures, file cabinets, book shelves) encountered in the volume of space 395, and/or any of a number of other factors. The path 355 traveled by the CAFC device 302 allows the CAFC device 302 to thoroughly complete its task within the volume of space 395.

For example, if the CAFC device 302 is commissioning all electrical devices (types of equipment) within the volume of space 395, then the path 355 allows the CAFC device 302 to communicate with every electrical device in the volume of space 395 to initiate and complete the commissioning process for those electrical devices. As another example, if the CAFC device 302 is mapping all equipment within the volume of space 395, then the path 355 allows the CAFC device 302 to detect and accurately map each piece of equipment in the volume of space 395. In any case, the equipment can be located at any place (e.g., on the floor, on a wall 396, on the ceiling) within the volume of space 395.

The path 355 that the CAFC device 302 travels can be continuous, whether at constant or varying speeds. In addition, or in the alternative, the path 355 that the CAFC device 302 travels can have any of a number of stops, pauses, reversals, and/or other actions that go against forward movement along the path 355. Further, the CAFC 302 can travel in more than one direction along the path 355. For example, the CAFC 302 can travel forward and backward along a segment of the path 355. The path 355 can be linear, curved, and/or have any of a number of other features. The path 355 can be along one dimension (e.g., along a straight line), two dimensions (e.g., traveling non-linearly only along a floor), or three dimensions (e.g., varying height along with forward, backward, and/or sideways movement).

In any case, while traveling along the path 355, the CAFC device 302 can communicate continuously. Alternatively, the CAFC device 302 can communicate iteratively (e.g., at regular intervals, randomly, based on signals received from a piece of equipment) as the CAFC device 302 travels along the path 355. Communications from the CAFC device 302 can be sent to a particular piece of equipment, broadcast to multiple pieces of equipment, sent to a user 150, sent to a network manager 180, and/or in attempting to establish the characteristics (e.g., shape, size, location) of an object (not a piece of equipment) in the volume of space 395.

Figure 4:
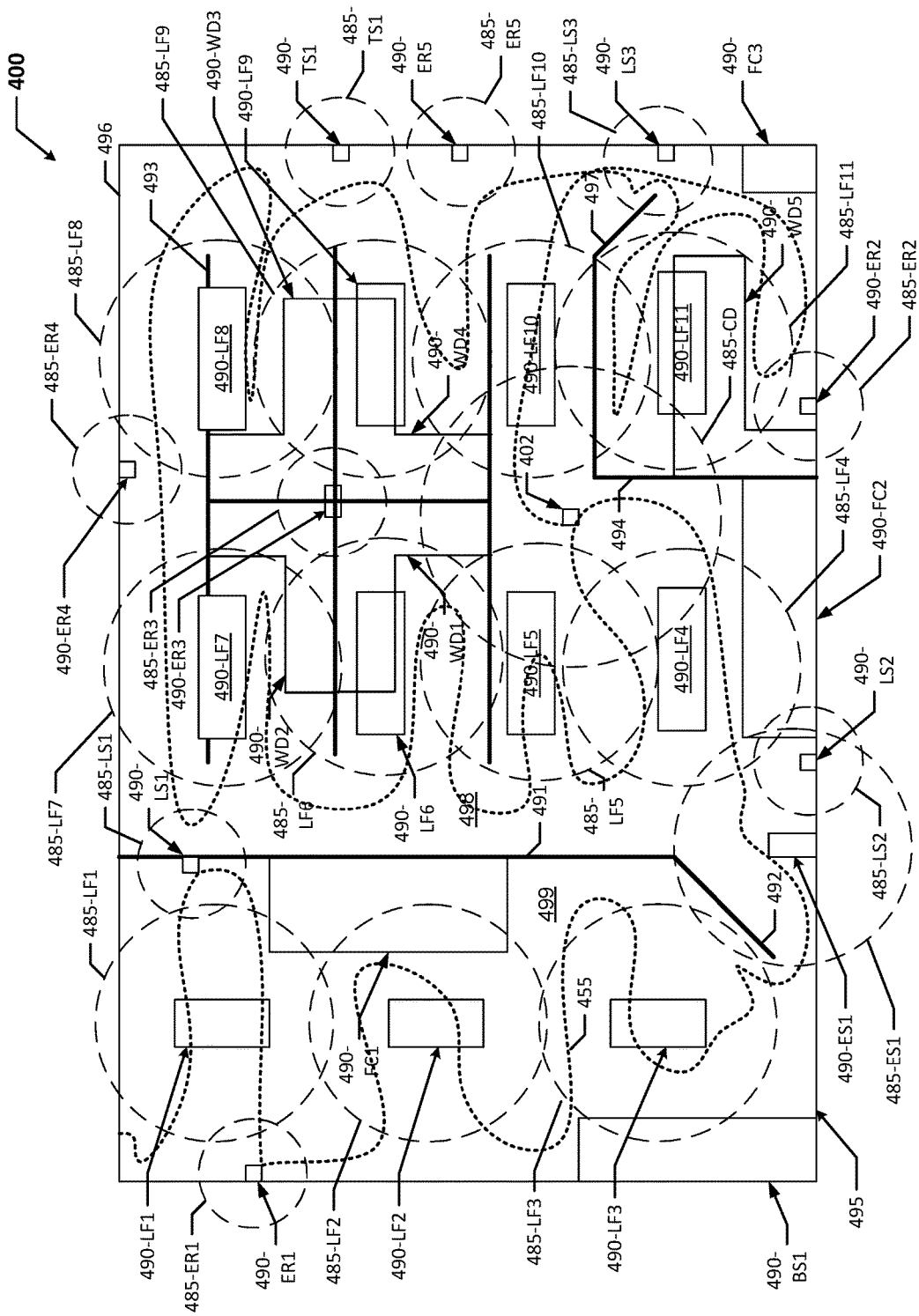
FIG. 4 shows a system in accordance with certain example embodiments.

FIG. 4 shows a system 400 in accordance with certain example embodiments. The system 400 includes a CAFC device 402 disposed within a volume of space 495. The system 400 also includes various equipment 490. The equipment 490 in the system 400 of FIG. 4 includes both electrical devices and non-electrical devices. Among the equipment 490 that are non-electrical devices, there are three file cabinets 490-FC (file cabinet 490-FC1, file cabinet 490-FC2, and file cabinet 490-FC3), five work desks 490-WD (work desk 490-WD1, work desk 490-WD2, work desk 490-WD3, work desk 490-WD4, and work desk 490-WD5), and a book shelf 490-BS1.

Among the equipment 490 that are electrical devices, there are eleven light fixtures 490-LF (light fixture 490-LF1, light fixture 490-LF2, light fixture 490-LF3, light fixture 490-LF4, light fixture 490-LF5, light fixture 490-LF6, light fixture 490-LF7, light fixture 490-LF8, light fixture 490-LF9, light fixture 490-LF10, and light fixture 490-LF11), five electrical receptacles 490-ER (electrical receptacle 490-ER1, electrical receptacle 490-ER2, electrical receptacle 490-ER3, electrical receptacle 490-ER4, and electrical receptacle 490-ER5), a thermostat 490-TS1, three light switches 490-LS (light switch 490-LS1, light switch 490-LS2, and light switch 490-LS3), and an exit sign 490-ES1.

Also among the equipment 490 that are non-electrical devices are a number of walls (in this case, wall 491, wall 493, wall 494, and wall 496) and two doors (door 492, door 497). Wall 496 defines the outer perimeter of the volume of space 495. The volume of space 495 is divided into a number of areas. For example, wall 491 and door 492 separate a hallway 499 (in which light fixture 490-LF1, light fixture 490-LF2, light fixture 490-LF3, electrical receptacle 490-ER1, light switch 490-LS1, file cabinet 490-FC1, and book shelf 490-BS1 are located) from a work space 498 (in which the remainder of the equipment 490 is located). The exit sign 490-ES1 is located above the door 492 within the work space 498.

Wall 494 and door 497 define an office (in which light fixture 490-LF11, electrical receptacle 490-ER2, light switch 490-LS3, file cabinet 490-FC3, and work desk 490-WD5 are located) within the work space 498. In addition, a number of cubicle walls 493 are located within the work space 498 outside of the office. The CAFC device 402 as shown in FIG. 4 is located in the work space 498 outside of the office and adjacent to the cubicle walls 493.

When a piece of equipment 490 is an electrical device, the piece of equipment 490 can have a transceiver (similar to the transceiver 124 described above with respect to the CAFC device 102) that allows the equipment 490 to communicate with the CAFC device 402. In such a case, the equipment 490 can receive instructions to commission itself and send communications to the CAFC device 402 that identify the specific piece of equipment 490 and report on the status of the piece of equipment 490 during the commissioning process and/or after the commissioning process is complete.

In this case, light fixture 490-LF1, light fixture 490-LF2, light fixture 490-LF3, light fixture 490-LF4, light fixture 490-LF5, light fixture 490-LF6, light fixture 490-LF7, light fixture 490-LF8, light fixture 490-LF9, light fixture 490-LF10, light fixture 490-LF11, electrical receptacle 490-ER1, electrical receptacle 490-ER2, electrical receptacle 490-ER3, electrical receptacle 490-ER4, electrical receptacle 490-ER5, thermostat 490-TS1, light switch 490-LS1, light switch 490-LS2, light switch 490-LS3, and exit sign 490-ES1 each include a transceiver.

As discussed above, the transceiver of the CAFC device 402 and the transceiver of the piece of equipment 490 (for electrical devices) can communicate with each other using communication links 405. As shown in FIG. 4, each piece of equipment 490 that is an electrical device, by virtue of its own transceiver, has a communication link 405 that has a range 485. The range 485 can be any distance (e.g., 10 meters) that defines a maximum area or volume of space in which the transceiver can send and receive signals.

In this case, the transceiver of light fixture 490-LF1 has range 485-LF1, the transceiver of light fixture 490-LF2 has range 485-LF2, the transceiver of light fixture 490-LF3 has range 485-LF3, the transceiver of light fixture 490-LF4 has range 485-LF4, the transceiver of light fixture 490-LF5 has range 485-LF5, the transceiver of light fixture 490-LF6 has range 485-LF6, the transceiver of light fixture 490-LF7 has range 485-LF7, the transceiver of light fixture 490-LF8 has range 485-LF8, the transceiver of light fixture 490-LF9 has range 485-LF9, the transceiver of light fixture 490-LF10 has range 485-LF10, the transceiver of light fixture 490-LF11 has range 485-LF11, the transceiver of exit sign 490-ES1 has range 485-ES1, and the transceiver of thermostat 490-TS1 has range 485-TS1.

Further, the transceiver of electrical receptacle 490-ER1 has range 485-ER1, the transceiver of electrical receptacle 490-ER2 has range 485-ER2, the transceiver of electrical receptacle 490-ER3 has range 485-ER3, the transceiver of electrical receptacle 490-ER4 has range 485-ER4, the transceiver of electrical receptacle 490-ER5 has range 485-ER5, the transceiver of light switch 490-LS1 has range 485-LS1, the transceiver of light switch 490-LS2 has range 485-LS2, and the transceiver of light switch 490-LS3 has range 485-LS3. Similarly, the transceiver of the CAFC device 402 has a range 485-CD.

A transceiver of a piece of equipment 490 can communicate with the transceiver of the CAFC device 402 if the range 485 of the transceiver of the piece of equipment 490 intersects with the range 485-CD of the CAFC device 402. As the CAFC device 402 travels along its path 455, the range 485-CD of the transceiver of the CAFC device 402 eventually intersects the range 485 of every piece of equipment 490 having a transceiver within the volume of space 495.

In some cases, a transceiver of a piece of equipment 490 can communicate with the transceiver of another piece of equipment 490. In such a case, if the CAFC device 402 is unable to communicate directly with one piece of equipment 490, indirect communication between the CAFC device 402 and that piece of equipment 490 using the transceiver of one or more intermediary pieces of equipment 490. In such a case, the CAFC device 402 can commission and/or locate the position of a piece of equipment 490 that is not in direct communication with the CAFC device 402 by communicating with one or more intermediary pieces of equipment 490.

The example CAFC device 402 of the system 400 can commission some or all of the equipment 490 capable of being commissioned in one or more of a number of ways. For example, assuming that each piece of equipment 490 has a unique identification number (e.g., part of the stored data 134), when power is initially provided to the equipment 490, the transceiver of each piece of equipment 490 can broadcast its unique identification number over the communication links 405 (e.g., a radio channel of known frequency) within range 485-CD of the CAFC device 402. In addition, the example CAFC device 302 can initialize a table to record identification numbers and diagnostic data of each piece of equipment 490 being commissioned in the system 300.

In addition, or in the alternative, the CAFC device 402 can map some or all of the equipment 490 in the volume of space 495, regardless of whether the equipment 490 is an electrical device. For example, as the CAFC device 402 travels along the path 455 through the volume of space 495, the CAFC device 402, using one or more sensors (e.g., sensors 160) and/or the energy metering module (e.g., energy metering module 111), can determine various characteristics (e.g., size, location (e.g., x,y,z coordinates), shape) of each piece of equipment 490 in the volume of space 495. In addition, or in the alternative, one or more of such characteristics of a piece of equipment 490 can be determined based on stored data 134 about the piece of equipment 490 in the storage repository 130.

When the location of all equipment 490 in the volume of space 495 is determined using example embodiments, the CAFC device 402 can go into "sleep" mode or completely shut down. In some cases, the procedure for identifying and determining the location of the equipment 490 in the volume of space 495 can be re-run based on some factor (e.g., passage of time, instructions from a user, loss of power, replacement of a piece of equipment 490, repositioning or removal of a piece of equipment 490). Similarly, the CAFC device 402 can execute a commissioning process at any time after the initial commissioning process has been completed.

For example, if a new light fixture (a piece of equipment 490) is added a year after the system 400 of FIG. 4 is auto commissioned and mapped using example embodiments, then the CAFC device 402 can identify the exact location of the new light fixture, and the CAFC device 402 can also automatically commission the new light fixture. Similarly, if the thermostat 490-TS is replaced with a new thermostat, then the exact location of the new thermostat can be identified, and the new thermostat can be automatically commissioned by the CAFC device 402.

When the CAFC device 402 is used to determine the position of a piece of equipment 490 in the volume of space 495, a form of odometry and/or some other method (e.g., part of one or more algorithms 133 and protocols 132) can be used. The position of a piece of equipment 490 in the volume of space 495 can be determined in two or three dimensions. The accuracy of the position of the piece of equipment 490 in the volume of space 495 can be based on one or more of a number of factors, including but not limited to the number of times that the CAFC device 402 communicates with the object as the CAFC device 402 travels along its path 455.

In certain example embodiments, the process described above (or other processes contemplated herein) can be used for other purposes aside from, or in addition to, commissioning and mapping equipment 490. For example, by using measurements taken by the sensors 160, example embodiments can determine whether a level of light directed to a particular location within the volume of space 490 is appropriate. For instance, if a level of light measured by a sensor 160 at a location where a work station (e.g., near equipment 490-WD3) is located is determined to be too low (e.g., relative to a threshold value (stored data 134)), CAFC device 402 can adjust the light output automatically by instructing the power supply for the proximate light fixture (e.g., equipment 490-LF9) to provide more output (e.g., adjust a dimming level). Alternatively, the CAFC device 402 can notify the user 150 or the network manager 180 of the low light condition at the location.

As another example, when a piece of equipment 490 fails, the CAFC device 402 can use one or more sensors 160 and/or the energy metering module 111 to determine that the piece of equipment 490 has failed. Further, example embodiments can notify a user 150 or the network manager 180 of the failed piece of equipment 490 and its location in the volume of space 495.

Example embodiments can identify equipment within a volume of space and determine the location of each piece of equipment within the volume of space. Further, example embodiments can be used to automatically commission some or all of the equipment in the volume of space. Further, example embodiments can be used to automatically commission and/or map any new, moved, or replacement equipment in the volume of space over time. Example embodiments can also be used to perform audit functions (e.g., measure light levels, determine failures), whether during commissioning or during normal operation. Example embodiments can save time and resources while efficiently and automatically commissioning and mapping equipment in a volume of space.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. An automated commissioning and floorplan configuration (CAFC) device, comprising:
   a CAFC system comprising a transceiver and a CAFC engine, wherein the CAFC system is configured to:
      travel along a path in a volume of space with no previous knowledge of contents within the volume of space;
      identify, while traveling along the path, at least one piece of equipment in the volume of space;
      communicate, using the CAFC engine and the transceiver, with the at least one piece of equipment, wherein communicating with the at least one piece of equipment comprises receiving first identification information of the at least one piece of equipment and sending commissioning instructions to the at least one piece of equipment;
      identify, using the CAFC engine, a shape and a size of the at least one piece of equipment; and
      map the at least one piece of equipment in the volume of space.

2. The automated CAFC device of claim 1, wherein the CAFC system travels in two dimensions within the volume of space.

3. The automated CAFC device of claim 2, wherein the CAFC system travels in three dimensions within the volume of space.

4. The automated CAFC device of claim 2, wherein the transceiver wirelessly communicates with the at least one piece of equipment.

5. The automated CAFC device of claim 4, wherein the transceiver uses radio frequency waves.

6. The automated CAFC device of claim 5, wherein the CAFC system determines a frequency used by the at least one piece of equipment.

7. The automated CAFC device of claim 4, wherein the transceiver and the at least one piece of equipment are within range of each other.

8. The automated CAFC device of claim 4, wherein the transceiver and the at least one piece of equipment are outside of range of each other, wherein at least one intermediary device provides a bridge between the transceiver the at least one piece of equipment.

9. The automated CAFC device of claim 2, wherein the CAFC engine uses at least one algorithm to determine a distance between the CAFC engine and the at least one piece of equipment.

10. The automated CAFC device of claim 9, wherein the CAFC engine operates using a hardware processor.

11. The automated CAFC device of claim 1, wherein the at least one piece of equipment lacks any electrical components.

12. The automated CAFC device of claim 1, further comprising:
    at least one mobility feature that transports the CAFC system along the path within the volume of space as the CAFC system communicates with the at least one piece of equipment.

13. The automated CAFC device of claim 12, wherein the at least one mobility feature comprises a plurality of propellers that fly the CAFC system along at least part of the path.

14. The automated CAFC device of claim 12, further comprising:

at least one sensor that stabilizes the CAFC system as the CAFC system travels along the path within the volume of space.

15. The automated CAFC device of claim 1, further comprising:

at least one sensor that helps the CAFC system to locate the at least one piece of equipment in the volume of space.

16. A non-transitory computer-readable medium comprising instructions that when executed by a hardware processor perform a method for auto-commissioning a system of equipment, the method comprising:

traveling along a path in a volume of space with no previous knowledge of contents within the volume of space;

identifying, while traveling along a first section of the path, a first piece of equipment in the volume of space;

communicating with the first piece of equipment in the volume of space, wherein communicating with the first piece of equipment comprises receiving first identification information of the first piece of equipment and sending commissioning instructions to the first piece of equipment;

identifying a shape and a size of the first piece of equipment; and mapping the first piece of equipment in the volume of space.

17. The non-transitory computer-readable medium of claim 16, wherein the method further comprises:

reversing back along a segment of the path within the volume of space.

18. The non-transitory computer-readable medium of claim 16, wherein the method further comprises:

communicating, along a second section of the path, with a second piece of equipment in the volume of space, wherein communicating with the second piece of equipment comprises receiving second identification information of the second piece of equipment and sending commissioning instructions to the second piece of equipment, wherein the first piece of equipment and the second piece of equipment communicate to a network manager that the first piece of equipment and the second piece of equipment are commissioned.

19. The non-transitory computer-readable medium of claim 16, wherein the path is in three dimensions.

20. The non-transitory computer-readable medium of claim 16, wherein the method further comprises:

altering the path to avoid an object in the volume of space.

* * * * *